United States Patent
Kato

(10) Patent No.: US 6,637,822 B1
(45) Date of Patent: Oct. 28, 2003

(54) GARNISH ARRANGEMENT IN ANNULAR HEADREST FOR VEHICLE SEAT

(75) Inventor: Takashi Kato, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/158,046

(22) Filed: May 31, 2002

(51) Int. Cl.[7] .................................................. A47C 1/10
(52) U.S. Cl. ................ 297/397; 297/463.1; 297/463.2; 297/391; 297/220
(58) Field of Search ................................. 297/391, 397, 297/220, 452.18, 440.12, 463.1, 463.2

(56) References Cited

U.S. PATENT DOCUMENTS

| | | | |
|---|---|---|---|
| 4,549,766 A | * 10/1985 | Nishino | 297/396 |
| 4,779,929 A | * 10/1988 | Kuchemann | 297/408 |
| 5,362,129 A | * 11/1994 | Itoh et al. | 297/391 |
| 5,967,612 A | * 10/1999 | Takei | 297/391 |
| 5,984,414 A | * 11/1999 | Adachi et al. | 297/391 |
| 6,378,946 B1 | * 4/2002 | Cope et al. | 297/452.2 |
| 6,394,551 B1 | * 5/2002 | Beukema | 297/391 |

FOREIGN PATENT DOCUMENTS

| | | | |
|---|---|---|---|
| DE | 3816168 | * | 5/1988 |
| EP | 0322374 | * | 12/1988 |
| EP | 0341683 | * | 5/1989 |
| JP | 3-33544 U | | 4/1991 |

* cited by examiner

*Primary Examiner*—Peter M. Cuomo
*Assistant Examiner*—Ericka Garrett
(74) *Attorney, Agent, or Firm*—Browdy and Neimark, P.L.L.C.

(57) ABSTRACT

A garnish arrangement in a through-hole of an annular headrest comprises at least one support wire member, a first cylindrical garnish member of synthetic resin material, and a second cylindrical garnish member of synthetic resin material. The support wire member extends across the through-hole of the annular headrest. The first and second cylindrical garnish members each has an engagement element and a stopper element. With this garnish arrangement, the first and second cylindrical garnish members are firmly engaged together within the through-hole at their respective engagement elements, while the support wire member is sandwiched between the stopper element of the first cylindrical garnish member and the stopper element of the second cylindrical garnish member, thereby providing a robust structure against deformation.

7 Claims, 3 Drawing Sheets

GARNISH ARRANGEMENT IN ANNULAR HEADREST FOR VEHICLE SEAT

BACKGROUND OF THE INVENTION

1. Field of the Invention

The present invention relates to a garnish arrangement in an annular headrest for a vehicle seat, and is particularly directed to an arrangement for securing a cylindrical garnish element of a synthetic resin material in the through-hole of a doughnut-like or annular headrest for a vehicle seat.

2. Description of Prior Art

Among various sorts of headrests for use on a vehicle seat, there has been known a doughnut-like or annular headrest having a through-hole formed therein. In most cases, a cylindrical garnish element is fitted in the through-hole of the annular headrest so that the inner wall of the through-hole is covered with the cylindrical garnish element to make the outer appearance of headrest improved aesthetically.

As disclosed for example from the Japanese Laid-Open Utility Model Publication No. 3-33544, a cylindrical garnish element of synthetic resin material is secured in the through-hole of annular headrest. In this prior art, the annular headrest is formed by a foaming process into such a structure that a foamed annular padding is covered with a trim cover assembly, with a headrest frame embedded in the foamed padding. The terminal ends of the trim cover assembly are attached to inward surfaces of the through-hole of the annular padding, which however presents an aesthetically poor condition or objectionable points in the through-hole of the resulting annular headrest. To conceal such condition and points, the cylindrical garnish element is attached in the through-hole of the annular headrest, thereby providing an aesthetically improved appearance of headrest or whole of vehicle seat.

According to this conventional headrest structure, fixation of the cylindrical garnish element in the through-hole of annular headrest is such that some securing bolts or rivets are passed through the garnish element and fastened to the headrest frame embedded in the headrest. Indeed, with such structure, the garnish element is positively and firmly mounted in the through-hole of headrest. However, the non-robust nature of garnish element, which is formed from a synthetic resin material, will be prone to deformation in the case where a great load is applied thereto from the head of passenger.

SUMMARY OF THE INVENTION

In view of the above-stated drawbacks, it is a primary purpose of the present invention to provide an improved garnish arrangement in an annular headrest for vehicle seat, in which a cylindrical garnish member is prevented against removal therefrom and protected against deformation.

In order to achieve such purpose, a garnish arrangement in the annular headrest in accordance with the present invention is basically comprised of:
  a support frame means connected with a headrest frame of the annular headrest, the support frame means extending in a through-hole of the annular headrest in the transverse direction thereof;
  a first cylindrical garnish member of a synthetic resin material disposed in the through-hole at one side of the support frame means, the first cylindrical garnish member including a first engagement means and a first stopper means; and
  a second cylindrical garnish member of a synthetic resin material disposed in the through-hole at another side of the support means; the second cylindrical garnish member including a second engagement means and a second stopper means,
  wherein the first engagement means of said first cylindrical garnish member is firmly engaged with the second engagement means of said second cylindrical garnish member in such a manner that the support frame means is contacted with and sandwiched between the first and second stopper means respectively of the first and second cylindrical garnish members.

Accordingly, a whole garnish body can be assembled in a robust way by firmly engaging the first and second garnish members together via said first and second engagement means, and a great load applied from the head of passenger is dispersed via said first and second stopper means to the support frames means. Hence, the thus-constructed garnish element is positively prevented against removal from the headrest through-hole and also protected against deformation, even when a great load is applied thereto.

Other various features and advantages will become apparent from reading of the descriptions hereinafter, with reference to the annexed drawings.

DETAILED DESCRIPTION OF PREFERRED EMBODIMENT OF THE INVENTION

Referring to FIGS. 1 to 5, there is illustrated one preferred embodiment of garnish arrangement in an annular headrest provided on a vehicle seat, as generally designated by (G).

In the illustrated embodiment, the vehicle seat comprises a seat cushion (SC), a seat back (SB), and an annular headrest (HD) integrally formed on the seat back (SB). As indicated by the dot lines, a seat back frame (3) is embedded in the seat back (SB) and a generally inverted-U-shaped headrest frame (30) is integrally formed with top portion of the seat back frame (3). As can be seen from FIGS. 2 and 3, the seat back (SB) is, for example, formed by a known foaming process involving the steps of placing the seat back frame (3) in a predetermined foaming die (not shown), injecting a liquid foaming material in the die, and curing the liquid foaming material to create a foamed padding (60) having a particular shape of seat back (SB) with an annular headrest portion (HD) integrally defined in the top portion thereof, wherein a through-hole (H) is defined in the annular headrest portion (HD) and the seat back frame (3) is embedded integrally in the foamed padding (60). The foamed padding (60) is covered with a trim cover assembly (50) to provide a finished seat back (SB) with the through-hole (H) defined in the annular headrest portion (HD) thereof. Of course, this is not limitative, but the headrest (HD) per se may be formed independently of the seat back (SB), together with its own headrest frame (not shown) under such foaming process and may be mounted on the seat back via a headrest stay (not shown) or the like which is connected with the seat back frame (3).

Figure 3:
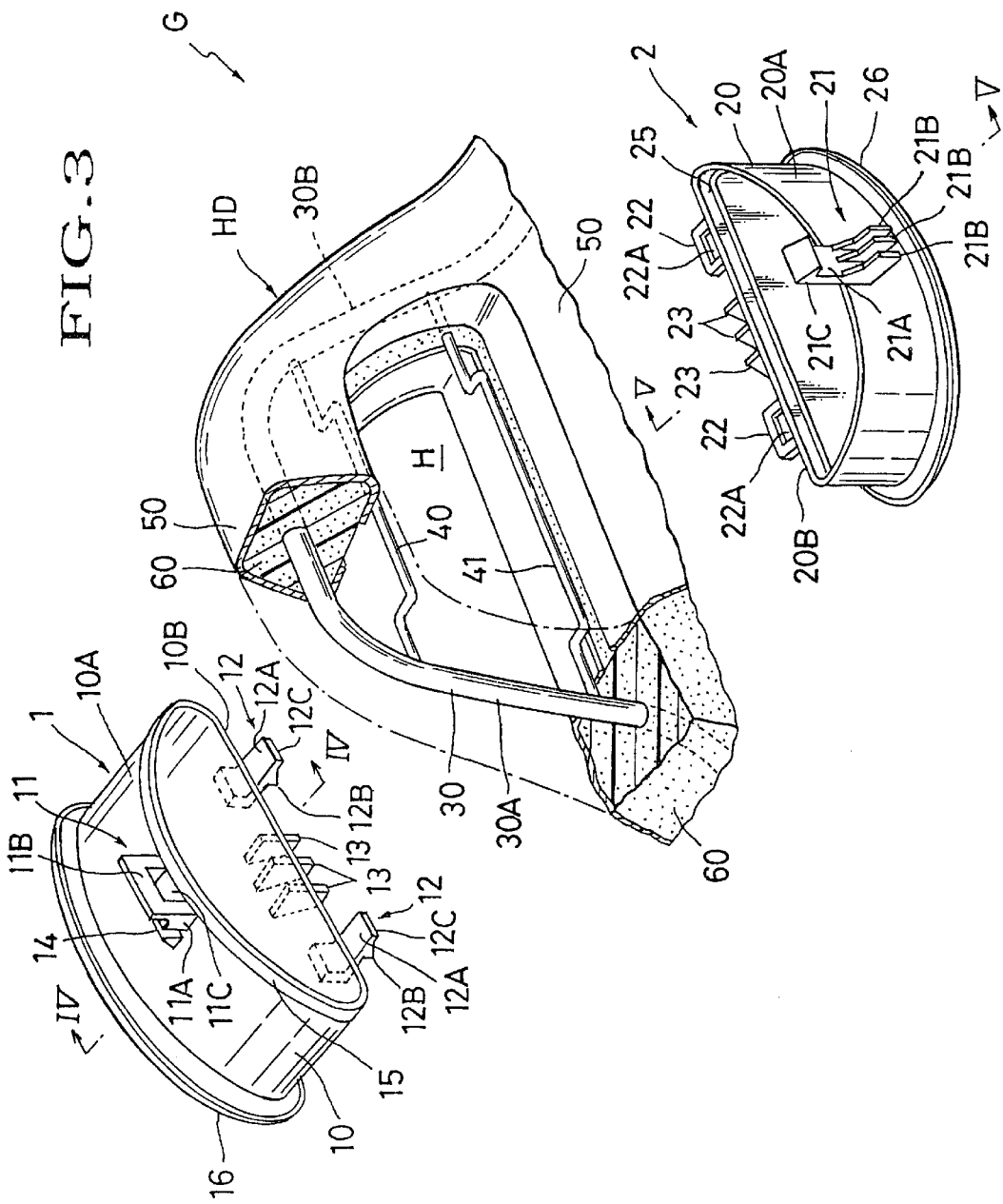
FIG. 3 is a partly broken, exploded perspective view of the principal parts of the garnish arrangement.

As best seen in FIG. 3, in that through-hole (H), there lies the two terminal ends of the trim cover assembly (50) such that they are spaced apart from each other on the inner walls of the through-hole (H) and therefore, a localized part of the foam padding (60) is exposed between those two terminal ends.

In accordance with the garnish arrangement (G) of the present invention, a pair of spaced-apart first and second support cross wire members (of rigid steel material for example) (40) (41) are extended and connected by welding between the two lateral frame sections (30A) (30B) of the generally inverted-U-shaped headrest frame (30). As shown in FIG. 3, the first and second support cross wire members (40) (41) extend transversely in the through-hole (H) of the annular headrest portion (HD). A cylindrical garnish element to be secured in that through-hole (H) is comprised of a first cylindrical garnish member (1) and a second cylindrical garnish member (2). Both first and second cylindrical garnish members (1) (2) are formed from a synthetic resin material and are each of an outer configuration which is generally equal in size and shape to the through-hole (H) of annular headrest portion (HD).

The illustrated cylindrical main body (10) of the first garnish member (1) basically includes an arcuate upper wall (10A), a horizontal flat bottom wall (10B), an annular flange portion (16) formed integrally in one end thereof, and a slightly shaved annular engagement edge region (15) defined in another end thereof.

Figure 1:
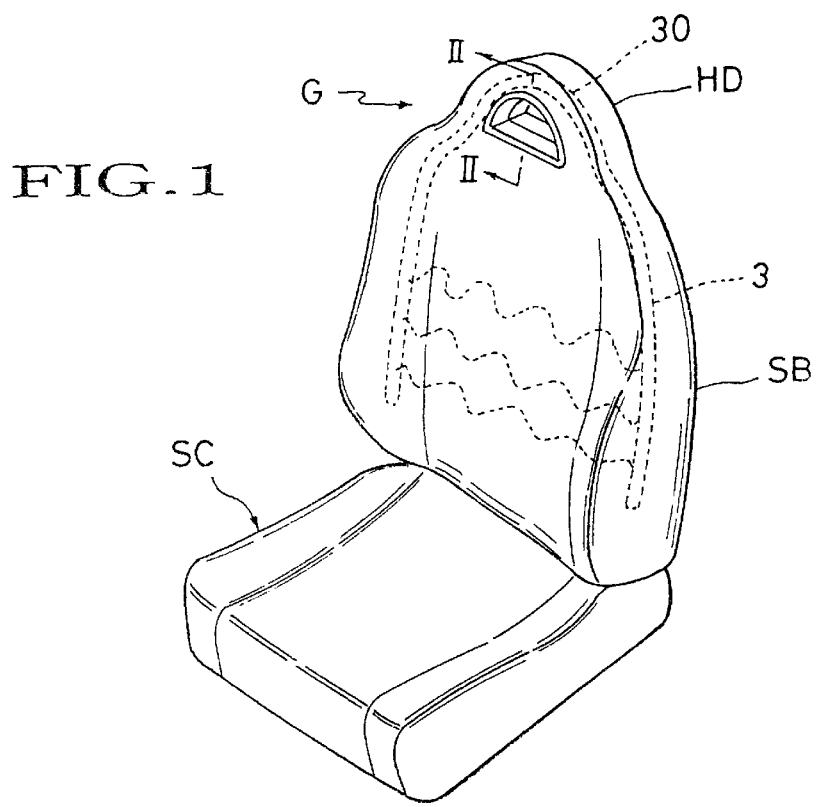
FIG. 1 is a schematic perspective view of a vehicle seat having a annular headrest in which a garish arrangement of the present invention is provided.
Figure 2:
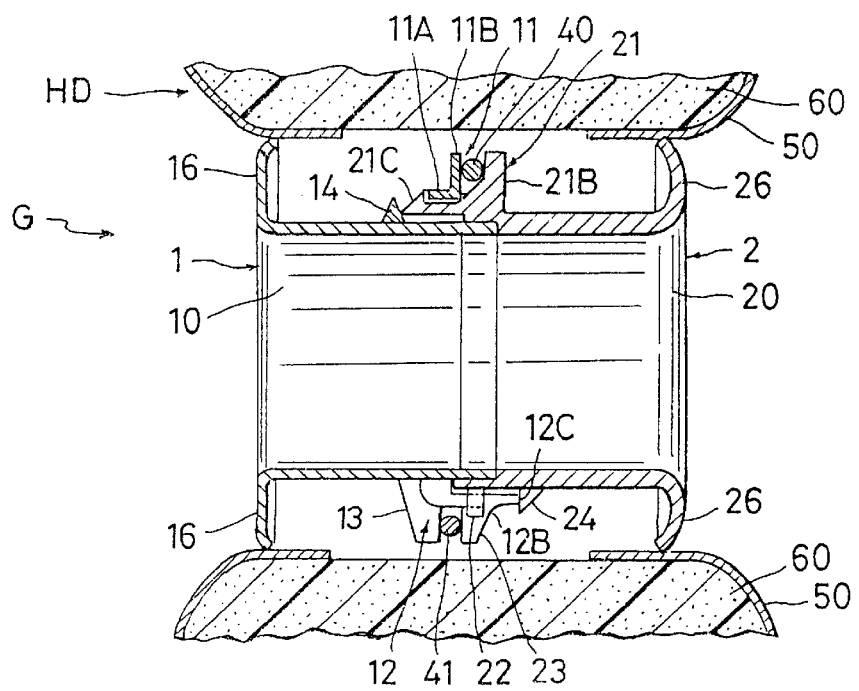
FIG. 2 is a schematic sectional view which explanatorily shows principal parts forming the garnish arrangement as well as its specific structure.
Figure 4:
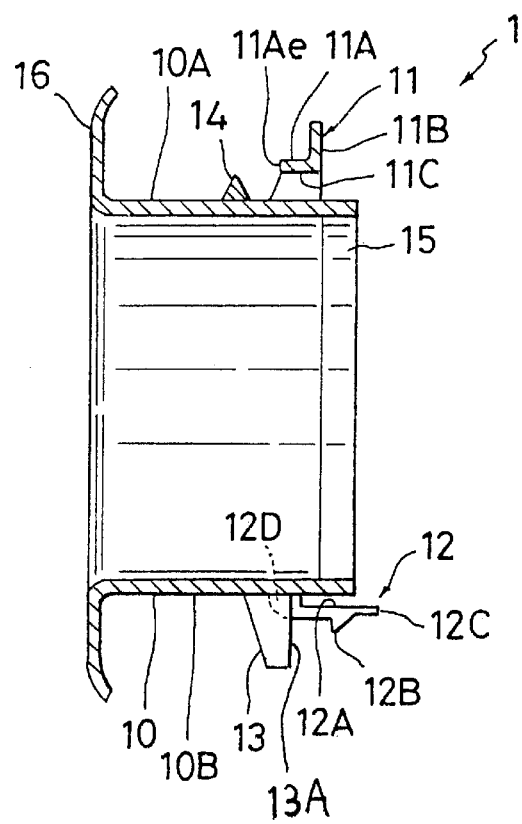
FIG. 4 is a sectional view of a first cylindrical garnish member.

Integrally formed on the central top point of the arcuate upper wall (10A) are a first female engagement member (11) and a stopper projection (14), such that the former (11) is situated at a point near to one end of the garnish member body (10) in the proximity of the engagement edge region (15), and the latter (14) is situated at a point spaced from the former (11) As seen from FIGS. 2, 3 and 4, the first female engagement member (11) comprises a horizontally extending base portion (11A) having a rectangular through-bore (11C) defined therein and a vertically extending stopper portion (11B) extending upright from the base portion (11A). As viewed from FIG. 3, the vertical planar surface of the stopper portion (11 B) faces to a vertical plane where the engagement edge region (15) lies, whereas the edge (11Ae) of the base portion (11A) faces to a plane opposite to such vertical plane where the flange portion (16) extends vertically. The stopper projection (14) is situated between the engagement member (11) and flange portion (16) at a point adjacent to the base portion edge (1 1Ae) in a spaced-apart relation therewith.

A pair of second male engagement members (12) (12) and three first stopper fin members (13) (13) (13) are integrally formed on the horizontal flat bottom wall (10B) of the garnish main body (10), as shown in FIG. 3, such that those three stopper fin members (13) are interposed between the two first male engagement members (12). As best seen in FIG. 4, the second male engagement member (12) comprises a base (12D) projected vertically from the bottom wall (10B), a horizontal plate body portion (12A) extending horizontally from the base (12D) in parallel with the bottom wall (10B), a hook-like anchor piece (12B) and an end portion (12C). The end portion (12C) projects a certain distance from the edge region (15) of garnish body (10). The three first stopper fin members (13) are disposed in an equidistantly spaced-apart relation with one another and projects vertically from the bottom wall (10B). Each stopper fin member (13) is of a generally trapezoidal shape having a vertical edge (13A) and so formed as to increase its width toward the bottom wall section (10B) for reinforcement purpose. Also, each stopper fin member (13) is situated at a point distant from the hook-like anchor piece (12B) of first male engagement member (12), but adjacent to the edge region (15) of garnish body (10), with the vertical edge (13A) thereof facing to a vertical plane wherein the engagement edge region (15) lies.

On the other hand, as illustrated, the cylindrical main body (20) of the second garnish member (2) basically has an arcuate upper wall (20A), a horizontal flat bottom wall (20B), a flange portion (26) formed integrally in one end thereof, and an engagement recessed edge region (25) defined in another end thereof.

Integrally formed on the central top point of the arcuate upper wall (20A) is a first male engagement member (21) comprising a horizontally extending plate-like body portion (21A) and a hook-like anchor end (21C) defined in the free end portion of the body portion (21) that projects horizontally and outwardly from the garnish member body (20). Three stopper fin members (21B) extends vertically from the base end portion of that body portion (21A) which is integral with the garnish member body (20). As seen from FIGS. 3 and 5, those first male engagement member (21) and stopper fin members (21B) are integrally formed as one unit on the central top point of arcuate upper wall section (20A), such that the male engagement element (21A, 21C) projects horizontally from the inner recessed edge region (25) in the longitudinal direction of the second cylindrical garnish member body (20). The three stopper fin members (21B) are each so formed as to diverge its lower base portion toward the upper wall (20A) for reinforcement purpose and disposed at a point corresponding to that inner recessed edge region (25). Hence, it is seen that the first male engagement member (21) is disposed in correspondence with the first female engagement member (11).

Figure 5:
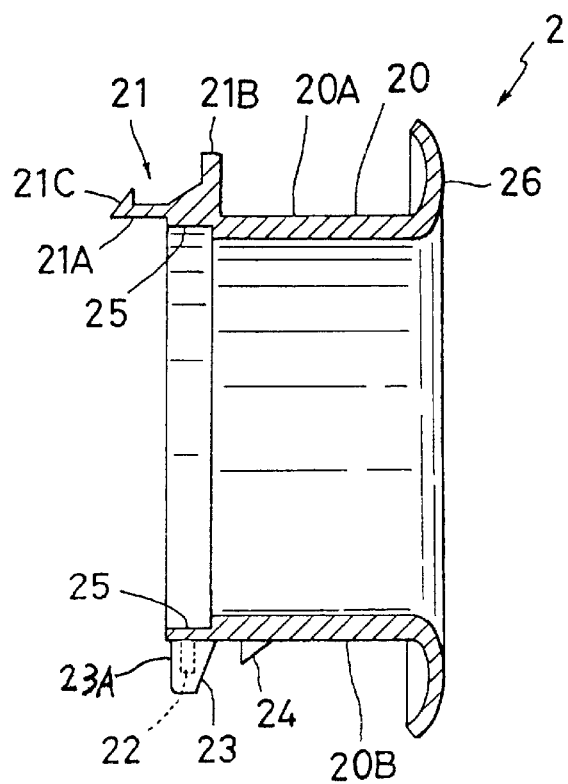
FIG. 5 is a sectional view of a second cylindrical garnish member.

Further, a pair of second female engagement members (22) (22), a pair of stopper projections (24) (24) (See FIG. 5, although one of the stopper projections is only shown therein), and three second retainer fin members (23) are integrally formed on the horizontal lower wall (20B), as seen from FIG. 3 and 5. Each of the two first female engagement members (22) is formed in a generally "U" shape having a through-hole (22A) defined therein. As understandable from FIG. 5, each stopper projection (24) is disposed at a point distant from the corresponding one of the two second female engagement members (22). The three second stopper fin members (23) are interposed between the two first female engagement members (22) and are disposed in an equidistantly spaced-apart relation with one another, projecting vertically from the bottom wall section (20B). Each stopper fin member (23) is of a generally trapezoidal shape having a vertical edge (23A) and so formed as to increase its width toward the bottom wall section (20B) for reinforcement purpose. Both of the first female engagement members (11) and stopper fin members (23) are shown to be disposed at a point corresponding to the inner recessed engagement edge region (25). As viewed from FIG. 5, the vertical edge (23A) of the stopper fin member (23) faces to a vertical plane where the engagement edge region (25) lies, and the stopper projection (24) lies between the second female engagement member (22) and the flange portion (26). It is noted that the two second female engagement members (22) are disposed in correspondence with the two second male engagement members (12), respectively, while the three second stopper fin members (23) are in correspondence with the three first stopper fin members (13), respectively.

In assembly, the annular edge portion (at 15) of the first garnish member (1) is inserted into one side of the through-hole (H) of headrest (HD), while at the same time, the annular edge portion (at 25) of the second garnish member (2) is inserted into another side of the through-hole (H), so that the first male engagement member (21) is snappingly inserted and anchored in the through-bore (11C) of the second female engagement member (11), and the two second male engagement members (12) are snappingly inserted and anchored in the two second female engagement members (22), respectively. More specifically, as understandable from the schematic diagrams of FIG. 2 in conjunction with FIGS. 3 to 5, the hook-like anchor portion (21C) is snappingly anchored over the edge (11Ae) of first female engagement member base portion (11A), with the distal end of the hook-like anchor portion (21C) being abutted against the stopper projection (14). On the other hand, each of the two hook-like anchor portions (21B) is snappingly anchored over the edge of through-hole (22A) of each of the two female engagement members (22), with the distal end (12C) of each male engagement member (12) being abutted against the stopper projection (24). Of course, the annular recessed edge region (25) of second garnish member (2) is fit attached on and about the annular edge region (15) of first garnish member (1). Accordingly, with such simple assembly, the first and second garnish members (1) (2) are firmly engaged together into one integral cylindrical garnish unit within the through-hole (H) of headrest (HD). In addition, the first support cross wire member (40) is sandwiched between the stopper portion (11B) of the first female engagement member (11) and the three stopper fin members (21B), whereas on the other hand, the second support cross wire member (41) is sandwiched between the vertical edges (13A) of first three stopper fin members (13) and the vertical edges (23A) of second three stopper fin members (23).

Accordingly, the garnish arrangement (G) in accordance with the present invention has the following effects and advantages:

(i) The garnish element in the annular headrest (HD) can easily be assembled in a robust way by engaging the two garnish members (1) (2) together through the simple snapping engagements among the male and female engagement members (11, 21, 12, 22).

(ii) The upper and lower points of the thus-assembled garnish element body are contacted with the first and second support wire members (40) (41), respectively. This is not only effective in supporting the garnish element body (i.e. 1 and 2) firmly within the annular headrest (HD), but also dispersing a great load applied from the head of passenger to each of the two support wire members (40) (41) and allowing the dispersed load to be quickly escaped to the seat back frame (3) through the headrest frame (30). Hence, the garnish element body of a relatively fragile synthetic resin material is positively prevented against removal from the headrest through-hole (H) and also protected against deformation, even when a great load is applied thereto. In this regard, the distal end of the hook-like anchor portion (21C) is abutted against the stopper projection (14) and the distal end (12C) of each male engagement member (12) is abutted against the stopper projection (24). This insures to not only prevent accidental disengagement of the two male engagement members (21) (12) from the respective two female engagement members (11) (22), but also reduce a great applied thereto in cooperation with the two support wire members (40) (41).

It should be understood that the present invention is not limited to the illustrated embodiment, but any other modification, replacement and addition may be applied thereto without departing from the scopes of the appended claims.

What is claimed is:

1. In an annular headrest having a through-hole and a headrest frame provided therein, a garnish arrangement comprising:

a support wire means connected with said headrest frame, said support wire means extending through said through-hole in the transverse direction thereof;

a first cylindrical garnish member of a synthetic resin material disposed in said through-hole at one side of said support wire means, said first cylindrical garnish member including a first engagement means and a first stopper means; and a second cylindrical garnish member of a synthetic resin material disposed in said through-hole at another side of said support wire means; said second cylindrical garnish member including a second engagement means and a second stopper means, wherein said first engagement means of said first cylindrical garnish member is firmly engaged with said second engagement means of said second cylindrical garnish member in such a manner that said support wire means is contacted with and sandwiched between said first and second stopper means respectively of said first and second cylindrical garnish members.

2. The garnish arrangement as defined in claim 1, wherein said first engagement means comprises: a first male engagement member formed on one side of said first cylindrical garnish member; said first male engagement member having an anchor portion; and a second female engagement member formed on another side of said first cylindrical garnish member, said second female engagement member having a hole formed therein, wherein said second engagement means comprises: a first female engagement member formed on one side of said second cylindrical garnish member in correspondence with said first male engagement member, said first female engagement member having a hole formed therein; and a second male engagement member formed on another side of said second cylindrical garnish member in correspondence with said second female engagement member, said second male engagement member having an anchor portion, and wherein said anchor portion of said first male engagement member is firmly engaged with said hole of said first female engagement member, while said anchor portion of said second male engagement member is firmly engaged with said hole of said second female engagement member, so that said first and second cylindrical garnish members are firmly engaged together against separation from each other.

3. The garnish arrangement as defined in claim 1, wherein said annular headrest is mounted on a seat back of a vehicle seat which has a seat back frame provided therein, and wherein said headrest frame is connected with said seat back frame.

4. The garnish arrangement according to claim 2, wherein one stopper projection is formed on said first cylindrical garnish member at a point adjacent to said second female engagement member and is contacted with said anchor portion of said first male engagement member, and wherein another stopper projection is formed on said second cylindrical garnish member at a point adjacent to said first female engagement member and is contacted with said anchor portion of said second male engagement member.

5. The garnish arrangement as defined in claim 1, wherein said first stopper means comprises at least one stopper piece formed on said first cylindrical garnish member; and said second stopper means comprises at least one second stopper piece formed on said second cylindrical garnish member.

6. The garnish arrangement as defined in claim 1, wherein said support wire means comprises a first support wire member extending transversely of one region of said through-hole and a second support wire member extending transversely of another region of said through-hole, wherein said first stopper means comprises at least one first stopper piece formed on one side of said first cylindrical garnish member and at least one second stopper piece formed on another side of said first cylindrical garnish member, wherein said second stopper means comprises at least one first stopper piece formed on one side of said second cylindrical garnish member and at least one second stopper piece formed on another side of said second cylindrical garnish member, and wherein said first support wire member is contacted with and sandwiched between said at least one first stopper piece of said first cylindrical garnish member and said at least one first stopper piece of said second cylindrical garnish member, while said second support wire member is contacted with and sandwiched between said at least one second stopper piece of said second cylindrical garnish member and said at least one second stopper piece of said second cylindrical garnish member.

7. In an annular headrest integrally formed on a seat back of a vehicle seat in which a seat back frame is provided, said annular headrest having, provided therein, a through-hole and a generally inverted-U-shaped headrest frame connected with said seat back frame, said generally inverted-U-shaped headrest frame having a pair of lateral frame sections, a garnish arrangement comprising:

a support wire means connected between said pair of lateral frame sections of said headrest frame so as to extend through said through-hole in the transverse direction thereof;

a first cylindrical garnish member of a synthetic resin material disposed in said through-hole at one side of said support wire means, said first cylindrical garnish member including a first engagement means and a first stopper means; and a second cylindrical garnish member of a synthetic resin material disposed in said through-hole at another side of said support wire; said second cylindrical garnish member including a second engagement means and a second stopper means, wherein said first engagement means of said first cylindrical garnish member is firmly engaged with said second engagement means of said second cylindrical garnish member in such a manner that said support wire means is contacted with and sandwiched between said first and second stopper means respectively of said first and second cylindrical garnish members.

* * * * *